E. F. PRESTON.
MILK-COOLER.
No. 193,177. Patented July 17, 1877.
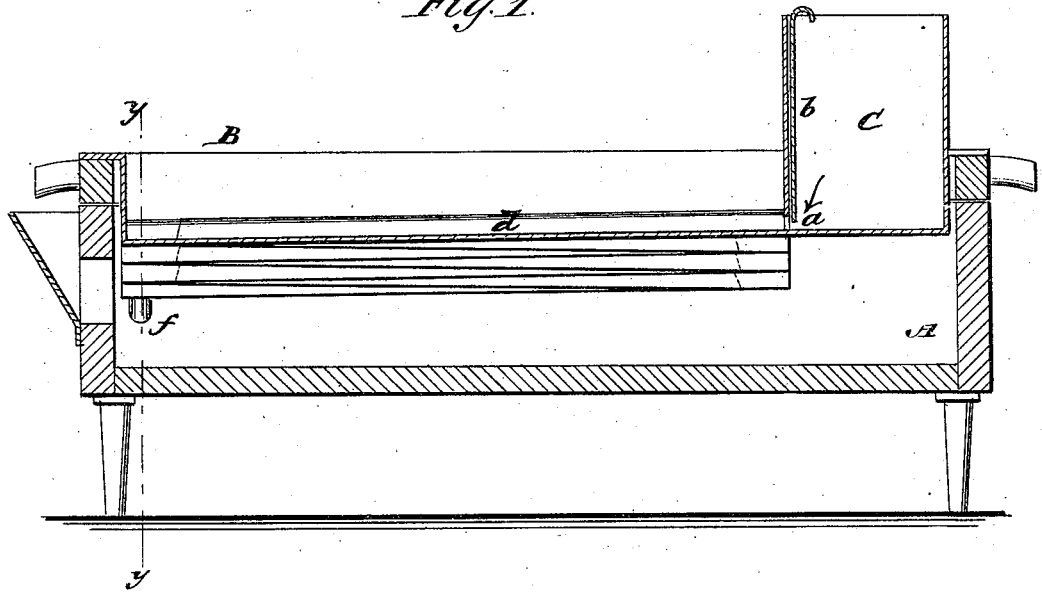
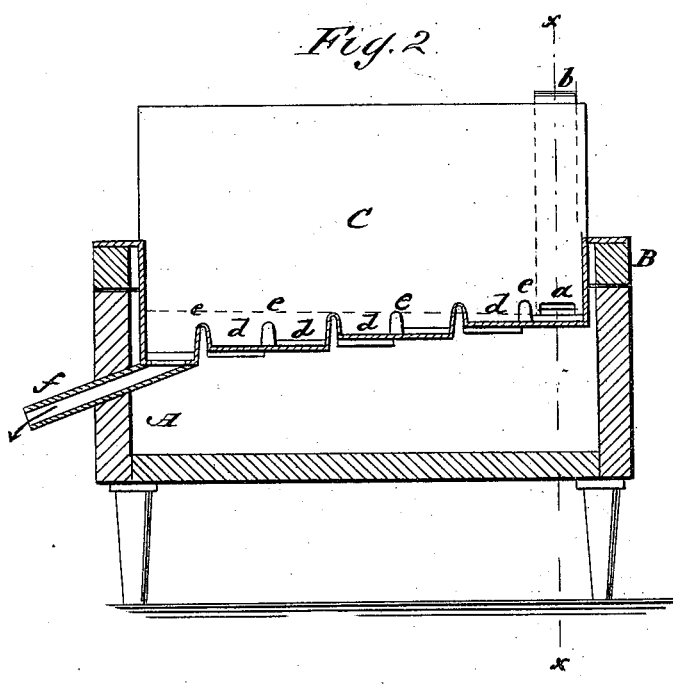
WITNESSES:
E. Wolff
J. H. Scarborough
INVENTOR:
E. F. Preston
BY
ATTORNEYS.

UNITED STATES PATENT OFFICE.

EDWARD F. PRESTON, OF CHARLOTTE, MICHIGAN.

IMPROVEMENT IN MILK-COOLERS.

Specification forming part of Letters Patent No. 193,177, dated July 17, 1877; application filed May 21, 1877.

*To all whom it may concern:*

Be it known that I, EDWARD F. PRESTON, of Charlotte, in the county of Eaton and State of Michigan, have invented a new and Improved Milk-Cooler, of which the following is a specification:

In the accompanying drawing, Figure 1 represents a vertical longitudinal section of my improved milk-cooler on line $x\ x$, Fig. 2; and Fig. 2 is a vertical transverse section of the same on line $y\ y$, Fig. 1.

Similar letters of reference indicate corresponding parts.

The invention relates to an improved milk cooler and aerator, by which the milk is conducted over a series of cooling-channels, so as to be thoroughly cooled and aired; and it consists of a tank with a pan having at one end a milk-receiver, from which the milk is conducted through an exit-opening and gate over a series of inclined channels, divided by raised longitudinal partitions or ridges extending alternately from one end to a short distance from the other end of the pan.

In the drawing, A represents a tank filled with cold water or ice, and B a cooling-pan, that is attached by flanges $a$ to a wooden frame, with handles for lifting the pan off the tank.

The tank is arranged with suitable water-supply and exit pipes, so as to keep up a constant body of cold water in the same.

The pan B is provided at one end with a receiving-receptacle, C, for the milk, from which the same is drawn onto the cooling-surface by an opening, $a$, near the bottom, and at one corner of the receiver the size of the opening and supply of milk being regulated by a slide, $b$.

The milk passes from the receiver C over a series of channels, $d$, that are formed by raised and hollow longitudinal partitions or ridges $e$, which are bent up from the bottom, as shown in the cross-section, Fig. 2, and extended first from the receiver to a short distance from the other end wall of the pan; then from this end wall back to some distance from the receiver, and so on alternately, forming thus passages at the ends for the milk.

The channels $d$ are arranged at a slight fall or inclination, that causes the milk to pass over the surface of the channels, passing at the end of the first channel to the next, and so on in a circuitous route over the pan, and out through the exit-tube $f$ of the pan.

The hollow partitions $e$ admit the cooling-water to act on both sides of the channels and increase the size of the cooling-surface, while the fall in the channels imparts a revolving motion to the milk from the sides and bottom of the cooling-channels to the center and surface of the milk, thus bringing the globules of milk to the air in rapid succession, and the warm milk to the bottom, so as to air and cool the milk thereby in quick and effective manner during the passage over the channels, which are all in contact with the water in the tank, that is filled up to the level of the highest channel.

Having thus described my invention, I claim as new and desire to secure by Letters Patent—

A milk cooler and aerator consisting of cooling-tank A, cooling-pan B, milk-receiver C, and channels $d$, all constructed, and the channels connected with receiver and outlet $f$, as shown and described.

EDWARD F. PRESTON.

Witnesses:
PHILO D. PATTERSON,
PARM. S. DE GROFF.